March 21, 1933.  C. W. MABEY  1,902,564
BUN PUNCHER AND TOASTER
Filed Feb. 15, 1929
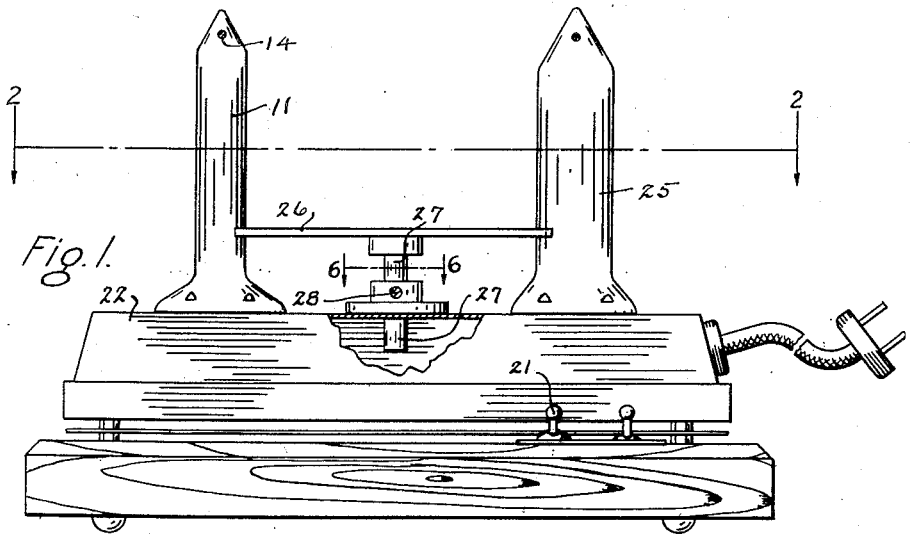
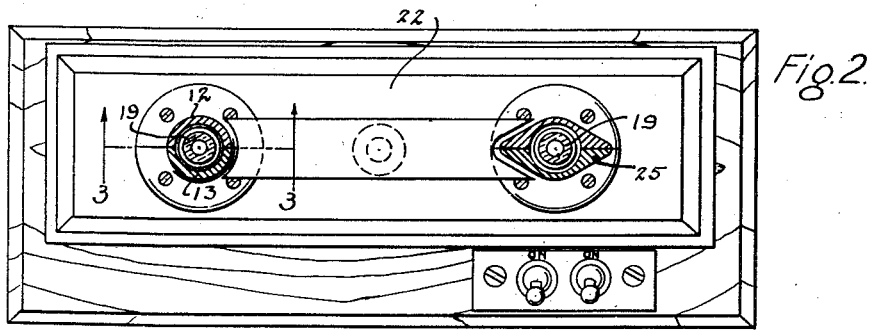
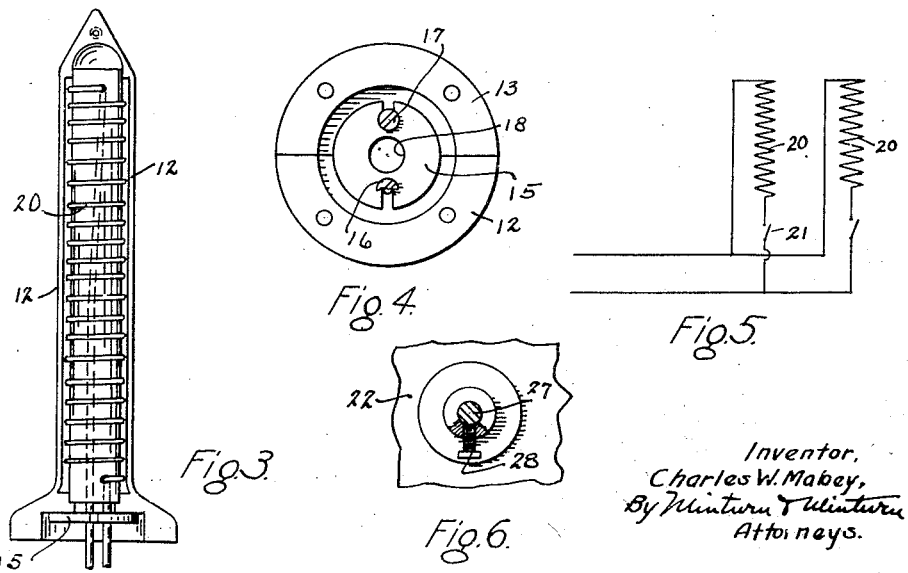
Inventor,
Charles W. Mabey,
By Minturn & Minturn,
Attorneys.

Patented Mar. 21, 1933

1,902,564

UNITED STATES PATENT OFFICE

CHARLES W. MABEY, OF INDIANAPOLIS, INDIANA, ASSIGNOR TO MABEY ELECTRIC AND MANUFACTURING COMPANY, OF INDIANAPOLIS, INDIANA, A CORPORATION OF INDIANA

BUN PUNCHER AND TOASTER

Application filed February 15, 1929. Serial No. 340,254.

This invention relates generally to the art of toasting, and in particular, to means for punching or forming a hole in a baked bun and toasting the interior wall of such a hole.

The invention is described in reference to the accompanying drawing, in which—

Fig. 1 is a rear elevation of a structure embodying the invention;

Fig. 2, a transverse section on the line 2—2 in Fig. 1;

Fig. 3, a vertical section on the line 3—3 in Fig. 2;

Fig. 4, a bottom plan view of a toaster post;

Fig. 5, a wiring diagram; and

Fig. 6, a transverse section on the line 6—6 in Fig. 1.

Like characters of reference indicate like parts throughout the several views in the drawing.

I form a post 11 out of two hollow, symmetrical sections 12 and 13 which are secured one to the other at the top end by the single screw 14 and at the bottom end by a washer 15 having slots entered from its outer periphery to engage under the screws 16 and 17 on the sections 12 and 13 respectively to have the hole 18 through the washer substantially concentric with the bore formed between the two sections. This washer 15 is carried in a recess from the base end of the sections.

A porcelain tube 19 is gripped between the upper and lower ends of the sections, Fig. 2, to have a substantial clearance therearound so that the resistance wire 20 wound about the tube 19 will not contact the section walls.

The ends of the wire 20 are brought out through the inside of the tube 19, through the washer 15, and placed in circuit with any suitable source of current with the aid of the control switch 21.

When placed together, these sections 12 and 13 form a relatively long cylindrical column, with a conical upper end, and a flared out base which is attached to a table 22. The cross-sectional shape of the post 11 may vary with the purpose for which it is to be used. For example, where a sandwich is to be made of a bun and a frankfurter, the cylindrical shape of the post 11 is suitable. The bun (not shown) is gripped in the operator's hand and pressed down over the pointed end of the post 11 and carried on down thereover for a distance substantially equal to the length of the frankfurter to be used. The point of the post perferably does not pass on out through the bun. The bun is held on the post 11 for a short time to permit toasting of the interior of the bun and the consequent settling of the hole to shape from the heat coming from the wire 20, and is then removed, a heated frankfurter inserted in the toasted hole, and is then served.

Should hamburg steak or chile be desired as filling within the bun, a differently shaped post 25 is preferably employed, having a cross-section, as shown in Fig. 2.

As a means for determining the length to which a bun should be pressed down over the posts without perforating the opposite end, I provide an adjustable stop bar 26, Figs. 1 and 2, here shown as carried horizontally between the posts 11 and 25 on a central rod 27 slidingly guided through the table 22, the rod 27 being held at any desired elevation by the set screw 28.

It is to be noted that by the device described, the bun need not be sliced open in halves to have its interior toasted, and that by forming a hole in the bun and then toasting it before withdrawing the hole punch, the hole is toasted to remain in shape and to retain the frankfurther or other filling without danger of sliding off the bun as is the case where a sandwich is made by cutting the bun into halves

I claim:

1. In a bun puncher and toaster, a post formed of a plurality of hollow longitudinally divided sections tapered to form a sharpened top and flared at the bottom to form an expanded base, a fixed base, means for detachably securing the upper portions of the sections together, means for removably securing the expanded base to the fixed base and an electric heating element located in the hollow of the post.

2. In a bun puncher and toaster, a hollow post longitudinally divided into two separable sections which are pointed at the top and expanded and recessed at the bottom, a screw uniting the sections at the top, means including a washer seated in the bottom recess and fastened to both sections thereby uniting them at the bottom and an electric heating element located in the post.

3. In a bun puncher and toaster, a hollow post widest in one transverse dimension, and longitudinally divided and separable into two parts in its widest dimension, said post being sharpened at the top, a fixed base to which the bottom of the post is attached, means including screws for removably uniting the parts of the post and a heating element in the hollow of the post.

4. In a bun puncher and toaster a fixed base, a hollow post fixed at one end to the base and sharpened at its other end, a heating element in the post, a stop bar in the path of a bun impaled on the post, a rod on which the stop bar is mounted slidingly guided in the fixed base and a screw means for retaining an adjustment of the rod.

In testimony whereof I affix my signature.

CHARLES W. MABEY.